July 5, 1932.  J. WAHL  1,866,140
PRESSURE GAUGE
Filed Oct. 12, 1929
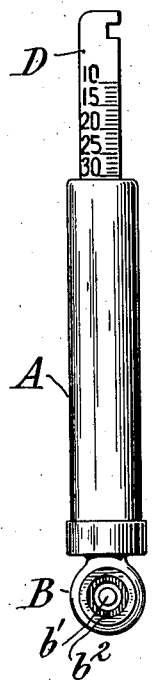
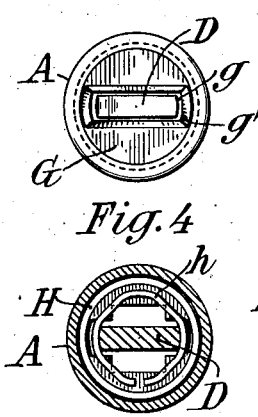
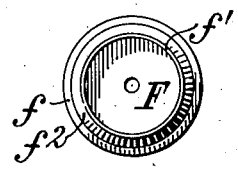
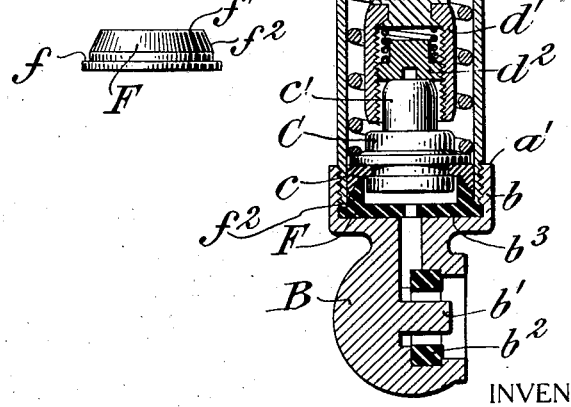
INVENTOR
John Wahl,
By Attorneys,

Patented July 5, 1932

1,866,140

UNITED STATES PATENT OFFICE

JOHN WAHL, OF ROSEDALE, NEW YORK, ASSIGNOR TO A. SCHRADER'S SON, INCORPORATED, OF BROOKLYN, NEW YORK, A CORPORATION OF NEW YORK

PRESSURE GAUGE

Application filed October 12, 1929. Serial No. 399,200.

The present invention relates to pressure gauges, and more particularly to pneumatic tire pressure gauges of the piston type, and aims to provide certain improvements therein.

In pressure gauges of the piston type and other devices wherein a piston provided with a compressible packing is used, difficulty has always been experienced in maintaining a leak-tight joint between the piston packing and the wall of the pressure chamber within which the piston is movable. Various means have been proposed to remedy this deficiency, but for one reason or another said means have not proven entirely satisfactory.

According to the present invention I provide an exceedingly simple and inexpensive means which overcomes the deficiency aforementioned and which can be embodied in devices employing a packed piston, for example, pneumatic tire pressure gauges, without modification of the piston structure. The invention in its broad aspect consists of means which acts to exert an outward pressure on the cylindrical or cupped portion of a piston packing, and in the case of a pressure gauge, to act upon the piston when it is in its initial or zero position to maintain said cupped portion in leak-tight engagement with the wall of the pressure chamber. The location of the means is also such as will always renew said outward pressure upon the packing every time the piston packing is brought or held in contact therewith.

In the preferred embodiment of my invention I rely upon the force of the gauge spring which continuously acts upon the piston and indirectly exerts the outward pressure on the piston packing. This I accomplish by locating within the pressure chamber a circumferential rib having an outer conical surface which is spaced from the wall of the chamber a distance such that the cupped wall of the packing will ride over and seat upon said conical surface when the piston is at its normal or zero position. The force of the gauge spring acting upon the piston in this position will cause the outer wall of the cupped packing to tightly press against the pressure chamber and provide a leak-tight joint therewith.

The invention also contemplates the provision of a swivel mounting for the pressure-indicating member so that the indicating member of the gauge may be turned to facilitate its reading irrespective of the position of the gauge with respect to the tire valve.

The invention also embodies other features of novelty which will be apparent from the detailed description which follows, considered in connection with the accompanying drawing, wherein Figure 1 is an elevation of the gauge embodying my invention.

Fig. 2 is a longitudinal section of the gauge with parts thereof shown in elevation.

Fig. 3 is a top plan view of the gauge shown in Figs. 1 and 2.

Fig. 4 is a section taken along the plane of the line 4—4 of Fig. 2.

Figs. 5 and 6 are a top plan and elevation respectively of the packing expander element forming part of the present invention.

In the accompanying drawing the invention is shown as applied to a pneumatic tire pressure gauge of the spring loaded piston type, wherein A is a cylindrical casing, which, for the purpose of economy, may be made of tubular stock. The casing A at its outer end is flanged inwardly to provide an overhanging lip $a$, and at its opposite end is externally screw-threaded, as shown at $a'$, and engages within an internally screw-threaded bushing $b$ on a foot portion B which is provided with the conventional tire valve deflating pin $b'$ and packing $b^2$ for engaging and forming a leak-tight joint with the top of a tire valve when the gauge is applied thereto.

Within the casing A there is provided a piston C which carries on its underside a cupped compressible packing $c$ which is adapted to engage the inner wall of the casing and provide a leak-tight seal therewith, and is provided on its upper side with a reduced cylindrical projection $c'$, the function for which will be presently made apparent.

Also positioned within the casing A and adapted to project slightly beyond its outer end is a substantially flat gauge bar D having pressure indicia $d$ on the opposite faces thereof. At its inner end the gauge bar D carries an internally threaded inverted cup-shaped member $d'$ within which there is screw-threadedly mounted a plug $d^2$. The plug $d^2$ is adapted to engage the top of the reduced projection $c'$ to determine the zero position of the gauge bar, which, it will be appreciated, will vary somewhat in different gauges owing to the differences in the tension of the spring E which surrounds the gauge bar and presses at one end against the piston C and slight differences in the pressure with which the packing $c$ engages the inner wall of the casing D. Hence, in order to compensate for these variable factors, the initial or zero position of the gauge bar with respect to the casing may be varied by adjusting the screw plug $d^2$. The gauge bar D is also formed near its outer end with a recess $d^3$ which is cut into one of its lateral edges to provide the projecting lip $d^4$, which may serve as a tire valve unseating element when it becomes necessary to vent some of the air from the tire after taking a gauge reading.

To always insure a proper leak-tight contact between the packing $c$ and the inner wall of the casing A, I provide within the casing and preferably at the inner end thereof, means for exerting an outward pressure upon the cupped portion of the packing at all times when the gauge is not in use or every time when the piston of the gauge is returned to its initial or zero position. The means which I propose to employ consists of a disk-like member F which is adapted to seat against the wall $b^3$ of the foot portion and preferably is clamped in such seating position by the inner end of the casing A engaging around the shoulder $f$ of the disk F, as best shown in Fig. 2. The disk F is formed on its upper face with a circumferential rib $f^1$, the outer face of which tapers inwardly toward its outer end to provide a conical surface $f^2$. This conical surface is adapted to engage the inner wall of the packing $c$ and press the same outwardly as said packing rides over and seats against said conical seat when pressed thereagainst by the force of the spring E. It will be apparent from the cooperative relation between the packing $c$, the spring E and the disk F, that a leak-tight joint between the packing and the casing will be always maintained.

Loosely positioned within the casing is a cap closure element or disk G having a diameter slightly greater than the diameter of the cap at the inturned lip $a$ so that the disk cannot pass therethrough. Said disk is formed with an opening $g$ of similar contour as the gauge bar and through which the latter is adapted to freely move, said opening $g$ being flanked by a struck-up flange $g'$.

Also positioned within the casing below the disk G is a second disk H formed with a struck-up portion to provide a shallow cup-shaped recess, within which is positioned a split spring ring $h$ having a contour which will prevent its passage through the opening $g$ in the disk G and adapted to frictionally engage the side edges of the gauge bar or indicating member D and hold the same in any position to which said gauge bar is projected by the piston after said piston has returned to its normal or zero position. The cupping in the disk H provides it on its underside with a circumferential recess $h'$ which provides a bearing seat for the upper end of the spring E. It will thus be seen that normally the spring E maintains the piston in its zero position and the closure cap G at the outer end of the casing. The disks G and H being loosely positioned within the casing and held against the inturned lip A merely by spring pressure, it will be apparent that said disks will be free to rotate within the casing when the gauge bar D is rotated. There is thus provided for the gauge bar a swivel mounting which is exceedingly simple and practicable.

The operation of the gauge and the manner of determining the pressure within a pneumatic tire with said gauge is substantially the same as that with tire pressure gauges now in conventional use, excepting for the fact that with the present gauge construction an absolutely tight joint between the piston packing and the gauge casing or pressure chamber is always maintained; that the gauge bar is swivelly mounted within the casing so as to facilitate reading the same; and that it possesses the added feature of a tire valve deflator element which in no way interferes with the operation of the gauge or provides the same with any protuberances of objectionable character.

While I have shown and described a preferred embodiment of my invention, it is to be understood that I do not wish to be limited to the details of construction set forth as the same may be varied without departing from the spirit of the invention.

What I claim is:

1. In combination, a cylindrical casing, a piston movable in said casing and provided with a packing forming a packed contact with the inner wall of the casing, and means independent of the piston for normally pressing the packing outwardly against the inner cylindrical wall of the casing.

2. In combination, a casing, a spring loaded piston movable in said casing and provided with a packing forming a packed contact with the inner wall of the casing, and a circumferential rib within the casing spaced from the wall thereof adapted to engage and spread the packing when the latter is pressed into contact with the rib by the piston swing.

3. A pressure gauge of the piston type comprising a piston provided with a packing, a pressure chamber within which the piston is movable, means within the pressure chamber independent of the piston for normally pressing the piston packing outwardly against the wall of the pressure chamber, and spring means acting upon said piston in opposition to the direction of movement thereof when acted upon by fluid pressure, normally pressing the piston packing into contact with said first mentioned means.

4. A pressure gauge of the piston type comprising a spring loaded piston provided with a compressible packing, a pressure chamber within which the piston is movable, and a circumferential rib within the pressure chamber and spaced from the wall thereof, adapted to bear against the piston packing when the piston is held at its normal or zero position by the piston spring.

5. A pressure gauge of the piston type comprising a spring loaded piston provided with a compressible cupped packing, a pressure chamber within which the piston is movable, and a circumferential rib having a conical outer wall within the pressure chamber and spaced from the wall thereof, adapted to engage and press outwardly upon the inner wall of the cupped packing when the piston is held at its normal or zero position by the piston.

6. A pressure gauge for pneumatic tires or the like comprising a casing which is open at its outer end whereat it is formed with an inwardly-overhanging flange, a piston movable in said casing, a non-circular indicating member movable by said piston, a closure cap loosely positioned within the casing below the overhanging flange and having an opening corresponding to the cross-sectional form of the indicating member which passes therethrough, and a spring within the casing bearing at one end against the piston, and at its other end pressing against the closure cap.

7. A pressure gauge for pneumatic tires or the like comprising a cylindrical casing which is open at its outer end whereat it is formed with an inwardly-overhanging lip, a piston movable in said casing, an indicating member movable by but disconnected from said piston, a circular closure cap loosely positioned within the casing below the overhanging lip and having an opening corresponding to the cross-sectional form of the indicating member which passes therethrough, a disk adjacent the closure cap provided with resilient means in engagement with the edges of the indicating member and adapted to hold said member at any position to which it is moved by the piston, and a spring within the casing bearing at one end against the piston and at its other end against the disk adjacent the closure cap.

8. A pressure gauge for pneumatic tires or the like comprising a casing which is open at its outer end whereat it is formed with an inwardly-overhanging lip, a piston movable in said casing, a non-circular indicating member movable by said piston, a closure cap loosely positioned within the casing below the overhanging lip and having an opening corresponding to the cross-sectional form of the indicating member which passes therethrough, said closure cap being swivelly mounted within the casing at said open end, and spring means within the casing for resisting movement of the piston and for holding the closure cap in position.

In witness whereof, I have hereunto signed my name.

JOHN WAHL.

CERTIFICATE OF CORRECTION.

Patent No. 1,866,140. July 5, 1932.

JOHN WAHL.

It is hereby certified that error appears in the printed specification of the above numbered patent requiring correction as follows: Page 3, line 32, claim 5, after the word "piston" insert the word spring; and that the said Letters Patent should be read with this correction therein that the same may conform to the record of the case in the Patent Office.

Signed and sealed this 6th day of September, A. D. 1932.

(Seal)

M. J. Moore,
Acting Commissioner of Patents.